(No Model.) 2 Sheets—Sheet 1.

A. N. NORMAND.
CLUTCH.

No. 538,741. Patented May 7, 1895.

WITNESSES:
R. H. Newman
F. A. Doolittle

INVENTOR
ARTHUR N. NORMAND
BY
C. M. Newman
ATTORNEY (No Model.) 2 Sheets—Sheet 2.

A. N. NORMAND.
CLUTCH.

No. 538,741. Patented May 7, 1895.

WITNESSES:
R. H. Newman
F. A. Doolittle

INVENTOR
ARTHUR N. NORMAND
BY
C. M. Newman
ATTORNEY

UNITED STATES PATENT OFFICE.

ARTHUR N. NORMAND, OF WATERBURY, CONNECTICUT.

CLUTCH.

SPECIFICATION forming part of Letters Patent No. 538,741, dated May 7, 1895.

Application filed February 9, 1895. Serial No. 537,808. (No model.)

*To all whom it may concern:*

Be it known that I, ARTHUR N. NORMAND, a citizen of the United States, and a resident of Waterbury, in the county of New Haven and State of Connecticut, have invented certain new and useful Improvements in Clutches, of which the following is a specification.

This invention relates to clutches, such as are used upon various machines, for making and breaking connections between a driving pulley and its shaft. Devices of this kind are largely used upon power presses where it is desired that the shaft should make but a single rotation, and that with rapidity and precision.

It is the object of my present invention to provide cheap and durable mechanism for accomplishing this purpose, and further, to provide an automatic safety device in connection with the clutch whereby the shaft is prevented a second rotation in quick succession without the assistance of the operator in charge of the machine upon which it is applied. A serious objection to many forms of clutches of this class now in use, is that the top pin when drawn out of engagement with the clutch mechanism frequently sticks and does not act quick enough in returning to its normal position, thus allowing the clutch to pass by on a second rotation. In my present invention I have sought to obviate this objection and to improve upon the device in general.

Upon the accompanying drawings, forming part of this specification, the same letters of reference denote corresponding or like parts throughout the several figures, and of which—

Figure 1:
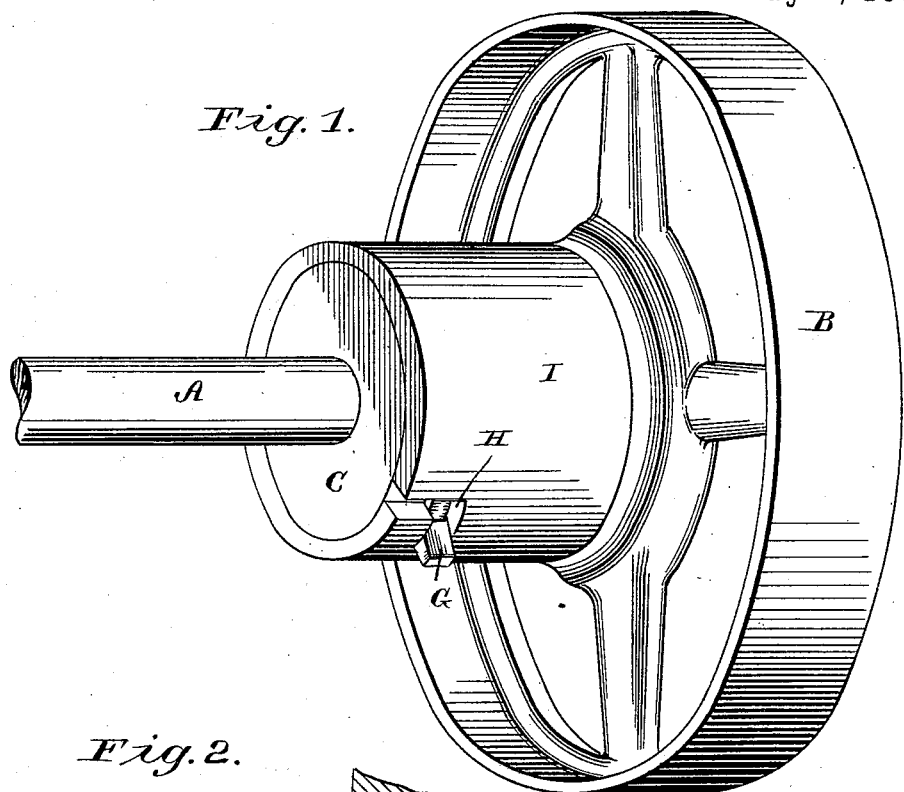
Figure 2:
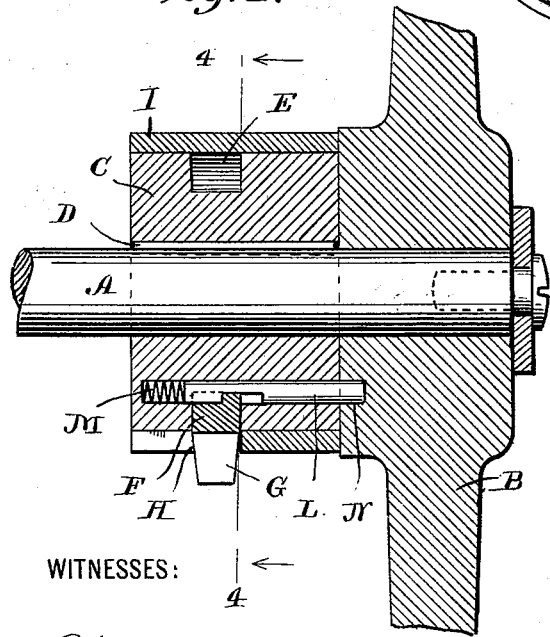
Figure 3:
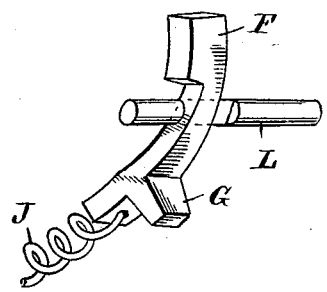
Figure 4:
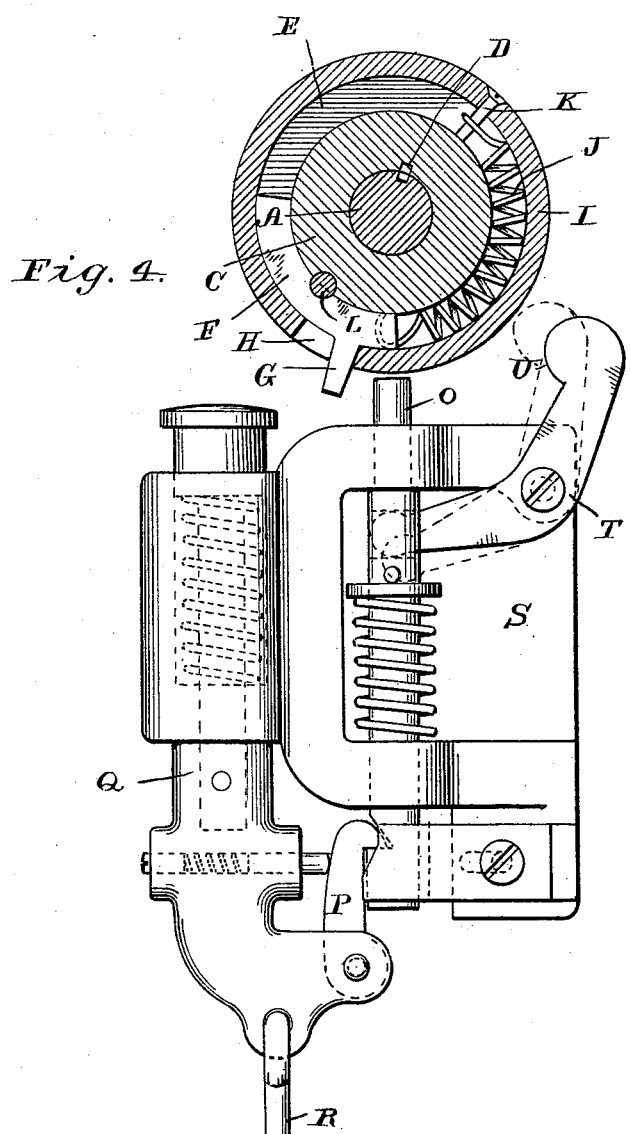

Figure 1 shows a perspective view of a driving-shaft, its driving-pulley, and my novel clutch connected therewith. Fig. 2 is a central vertical section through the clutch and hub of the wheel. Fig. 3 is a detail perspective view of two of the operating parts of the clutch. Fig. 4 is a section of the clutch on line 4 4 of Fig. 2, also showing in elevation the automatic safety device.

As before stated this clutch is applicable to various machines but is more particularly designed for presses where a loose revolving pulley is desired and which may be quickly locked to and unlocked from the shaft by a treadle connection in reach of the operator. These forms of machines being so common and well known I have deemed it unnecessary to illustrate one.

Referring to the letters of reference upon the drawings, A indicates a main power shaft, and B a main driving wheel which is loose upon said shaft and revolves idly thereon at such times when the bolt is not in engagement therewith.

The clutch mechanism proper consists of a cylindrical block C which is fixed to the shaft by means of a key D, or said block may be made integral with the shaft. This block is provided with a peripheral groove E (see Figs. 2 and 4) in which groove is fitted a cam faced slide F as clearly appears in Fig. 3. This slide is provided with a lug G which extends through an orifice H of the cylindrical shell I and is for the purpose of engagement with the stop pin of the treadle connection. This slide is further provided with a spiral spring J, which is fitted into the before mentioned peripheral groove, one end of said spring being fitted to said slide, the opposite end being suitably secured to the cylindrical shell by means of a screw K.

Transverse to the slide, F, is a locking pin L fitted into a bore of the block C. This pin is seated against a spiral spring M which serves to force it into engagement with the recess N of the hub of the driving pulley as shown in Fig. 2, said pin being withdrawn by means of its connection with the before mentioned cam faced slide F.

From the above construction and description it is obvious that when the lug G engages the stop pin O, the spring actuated slide F and its lug will be moved within its bearing and by reason of its cam surface engaging the shoulder of the locking pin, said pin will be drawn from the recess of the pulley against the action of the spring M, thus allowing said pulley to freely continue in its rotation, and further upon the withdrawal of the stop pin O, the slide F will be quickly drawn forward by reason of its spring and the aforesaid locking pin L will be free to engage the recess of the wheel hub, when the latter comes around in its rotation and registers therewith, thus carrying therewith the clutch, shaft, &c., driving the machine a single rotation when the lug G will again engage the pin of the treadle connection, and throw the clutch out as before stated.

Referring to Fig. 4 and the automatic safety device, O indicates the stop pin which is spring actuated in an upward direction, and is drawn down by means of a spring actuated pawl P engaging a notch of the lower end of the stop pin. This pawl is carried in a vertical spring actuated slide Q to which is connected the treadle connection R. Attached to the upper portion of the frame S of the stop mechanism, is a bell crank lever T one end of which is connected to the pin O, the other end being provided with a cam shoulder U which is designed to be thrown into the path of the lug G, (see dotted lines) at such time when the stop pin O has been drawn down out of the path of said lug. The purpose of this bell crank lever is for engagement by the lug G which will throw said arm out on the position indicated in full lines (see Fig. 4) thus forcing the pin O up to its normal position and insuring its readiness for engagement of the lug on its next rotation.

Having thus described my invention, what I claim, and desire to secure by Letters Patent, is—

1. In a clutch of the class described the combination with a driving pulley, of a shaft, a fixed block secured upon said shaft, a cam slide arranged in a groove of the periphery of said block, and having a lug thereon, a spring actuated locking pin L engaged by said slide and adapted to engage a recess in the hub of the driving pulley.

2. In a clutch mechanism of the class specified the combination with a wheel and driving shaft, of a block secured upon said shaft, a cam slide arranged in a groove of the periphery thereof and having a lug projecting outward therefrom, a cylindrical shell covering and secured to the block, and mechanism within the block for engagement with the driving pulley by a movement of the slide aforesaid.

3. In a device of the class specified the combination with a driving wheel, and its shaft, of a cylindrical block secured upon the latter, a shell covering said block, a cam slide fitted beneath the cover and having a lug thereon and extending through an orifice in said cover, a locking pin engaging the slide and driving wheel whereby said wheel is locked to and unlocked from said shaft by the movement of said slide.

4. In a device of the class described the combination with clutch mechanism substantially as shown, of a lug projecting therefrom, a stop pin for engagement with said lug, a bell crank lever pivoted to the frame work having one end engaging said stop pin, the other end adapted to be swung into the path of the lug of the clutch mechanism, and connections whereby the pin is operated.

Signed at Waterbury, in the county of New Haven and State of Connecticut, this 15th day of January, A. D. 1895.

ARTHUR N. NORMAND.

Witnesses:
WILLIAM J. SCHLEGEL,
FRED PETERSON.